United States Patent [19]
Weinstein et al.

[11] 3,755,079
[45] Aug. 28, 1973

[54] NUCLEAR REACTOR PLANT WITH INTEGRAL ENTOMBMENT

[75] Inventors: Albert A. Weinstein, Bronx, N.Y.; Fernand R. Nakache, Palos Verdes Estates, Calif.; Harry Soodak, Hastings-on-Hudson, N.Y.

[73] Assignee: The United States of America as represented by the United States Atomic Energy Commission, Washington, D.C.

[22] Filed: Dec. 12, 1969

[21] Appl. No.: 884,408

[52] U.S. Cl.......................... 176/87, 176/27, 214/1, 102/23
[51] Int. Cl............................................. G21c 13/00
[58] Field of Search...................... 176/87, 30, 27; 102/22, 23; 214/18 N, 16.18 C

[56] References Cited
UNITED STATES PATENTS

| | | | |
|---|---|---|---|
| 3,206,366 | 9/1965 | Bosshard | 176/30 |
| 3,330,122 | 7/1967 | Janner | 61/53.6 |
| 2,983,659 | 5/1961 | Treshon | 176/87 |
| 3,058,900 | 10/1962 | Frisch | 176/30 |
| 3,066,089 | 11/1962 | Davies | 176/30 |
| 3,079,995 | 3/1963 | Natland | 176/87 |
| 3,159,102 | 12/1964 | Riedl et al. | 102/22 |
| 3,192,121 | 6/1965 | Challender et al. | 176/87 |
| 3,243,353 | 3/1966 | Costes et al. | 176/87 |

FOREIGN PATENTS OR APPLICATIONS
1,055,702   4/1969   Germany .............................. 176/87

Primary Examiner—Reuben Epstein
Attorney—Roland A. Anderson

[57] ABSTRACT

A nuclear reactor installation comprising a shield structure having a reactor chamber and a burial chamber communicating with the reactor chamber, and means operating within the shield structure for moving the pressure vessel at the expiration of its operational life from the reactor chamber into the burial chamber.

21 Claims, 1 Drawing Figure

Patented Aug. 28, 1973
3,755,079
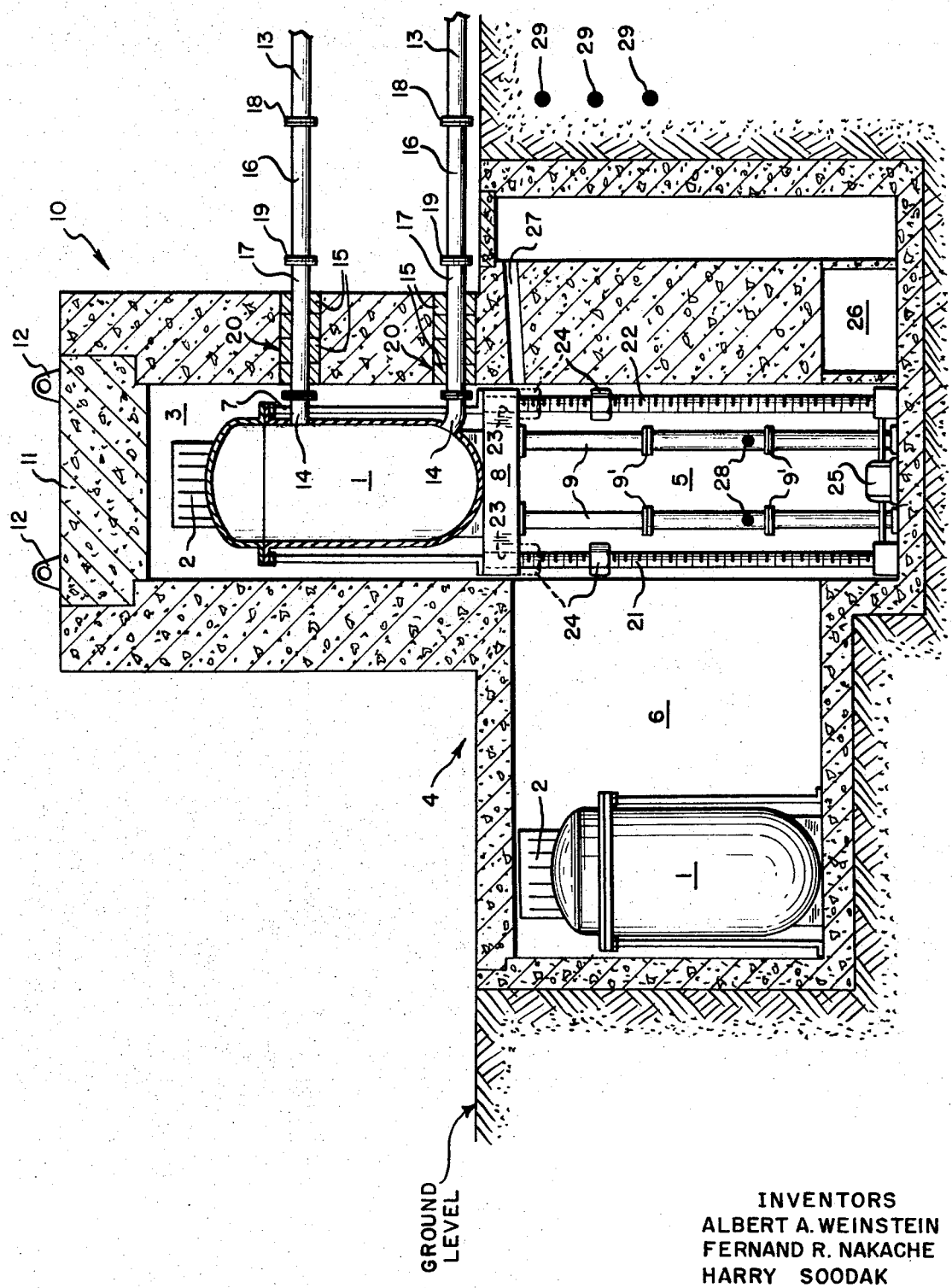
INVENTORS
ALBERT A. WEINSTEIN
FERNAND R. NAKACHE
HARRY SOODAK
BY
Pennie, Edmonds, Morton, Taylor & Adams
ATTORNEYS

NUCLEAR REACTOR PLANT WITH INTEGRAL ENTOMBMENT

BACKGROUND OF THE INVENTION

Several problems are encountered in the diposal of materials which have become contaminated by radioactivity as a result of their use in or about nuclear reactor installations wherein such materials are subjected to intensive nuclear bombardment over extended periods of time. Particularly acute problems are involved in the disposal of nuclear reactor pressure vessels when they no longer are capable of functioning safely as a component of a nuclear reactor structure.

Several methods have been heretofore devised for disposing of these vessels. One method commonly employed for this purpose involves transporting the spent reactor vessel to a remote and deserted location for burial beneath the surface of the earth at a depth sufficient to effectively isolate it from the surrounding atmosphere. Typically, the contaminated vessel is also encased in cement or other suitable material as a precautionary measure to eliminate the danger of radioactive leakage to the surface. Another method commonly employed to dispose of contaminated reactor vessels involves encasing the spent reactor vessel in cement or other suitable material and thereafter submerging it in deep ocean waters remotely located from populated areas.

However, due to the fact that reactor vessels are extremely large and massive, they are difficult to handle; and costly powerful moving equipment is required to transport these spent vessels to the burial site. Furthermore, because of radioactive contamination these spent vessels must be housed in a shield structure during transportation so that populated areas through which the vessel must pass on its journey to the burial site are adequately protected from the harmful effects of radioactivity. The shield structure in itself is even more massive than the vessel and, therefore, the transporting operation is made even more difficult and complicated. Still further there is a risk that the area surrounding the reactor installation will become contaminated in removing the reactor vessel from the shield in which it is contained at the installation site and loading it into the transportation shield and into the transporting vehicle. Also, elaborate and costly safety measures must be instituted to protect the workmen involved.

With the above observations in mind, the present invention provides a method and apparatus for conveniently and economically disposing of a spent reactor vessel which substantially overcomes the problems discussed above.

SUMMARY OF THE INVENTION

In accordance with the teachings of the present invention there is provided a nuclear reactor installation or plant constructed so that disposal of the reactor pressure vessel at the expiration of its operational life may be accomplished by placing it in an on-site tomb formed as an integral part of the reactor installation itself. In construction the installation includes a shield structure comprising a reactor chamber in which the pressure vessel is housed during its operational life and a burial chamber communicating with the reactor chamber and into which the pressure vessel is placed at the expiration of its useful life.

The pressure vessel is normally supported on a detached platform which defines the floor of the reactor chamber and the burial chamber is situated directly therebeneath. For effecting transfer of the pressure vessel into the burial chamber, elevator drive means for the platform is provided. This means is operable to lower the platform and the supported pressure vessel into the burial chamber.

After placement of the pressure vessel in the burial chamber, permanent sealing thereof may be effected by pouring suitable sealing material into the remaining volume of the tomb formed by the burial chamber. Alternatively, the spent pressure vessel may be moved into an auxiliary entombment area in the burial chamber and the platform raised into its initial position so that a new pressure vessel may be installed for continued operation of the installation.

BRIEF DESCRIPTION OF THE DRAWING

The sole FIGURE shown in the accompanying drawing is a cross-sectional elevation view of the preferred embodiment of the nuclear reactor installation according to this invention.

DETAILED DESCRIPTION OF THE INVENTION

As shown in the drawing, the nuclear reactor installation includes a thick wall shield structure, indicated generally by reference numeral 10, and a nuclear reactor pressure vessel 1 into which nuclear fuel can be placed by means of control rods 2. To protect the surrounding atmosphere from radioactive contamination the pressure vessel is contained within the shield structure 10 both during and after its operational life.

The shield structure is made of biological shielding material such as concrete, lead, or other suitable material and comprises a reactor chamber 3 within which the pressure vessel 1 is housed during its operative service life and an integrally formed burial chamber 4 communicating with the reactor chamber 3 and into which the pressure vessel 1 is placed after its operative service life has expired, all of which will be explained in more detail below. In the presently preferred embodiment of this invention, the reactor chamber is situated above ground while the burial chamber 4 is situated below ground level. If desired, however, the entire shield structure including both the reactor chamber and burial chamber 3 and 4, respectively, may be located either above or below ground level depending on the nature of the terrain and the general economics involved in constructing the installation. As shown, the reactor chamber is accessible from above. For this purpose a removable cover 11 is provided, and to facilitate removal, the cover 11 is equipped with apertured ears 12.

The burial chamber 4 is divided into a primary entombment area 5 located directly beneath the reactor chamber 3 and an auxilliary entombment area 6 adjoining the primary entombment area 5. The primary entombment area has a volume sufficient to accommodate a single pressure vessel while the adjoining auxillary entombment area may have a volume sufficient to accommodate any number of pressure vessels. The volume of the auxilliary entombment area is generally determined with reference to the expected service life of the pressure vessel is compared with the operative life of the entire installation. Thus, for example, if the expected service life of the pressure vessel is one half that of the entire installation, an auxilliary entombment area sufficient in volume to accommodate one vessel will suffice. The other vessel exhausted during the period in which the installation is operative will, of course, be buried in the primary entombment area 5.

During the operational phase of the nuclear reactor, the pressure vessel 1 is supported within the reactor chamber via support skirt 7 on a support member or platform 8 which is detached on all sides from the shield structure 10 for a purpose to be described hereinafter. The support platform is, in turn, fixedly supported for the vessel operating life in a position defining the floor of the reactor chamber by rigid support columns 9 extending upward from the floor of the primary entombment area 5. Each column is advantageously constructed in sections which are connected together by coupling members 9' so that each column may be conveniently dismantled when the pressure vessel is ready for entombment.

Coolant is supplied to the pressure vessel during its operational life through coolant pipes 13 which are connected to nozzles 14 of the pressure vessel. To permit each coolant pipe to be easily disconnected when the pressure vessel is ready for entombment, the terminal portion of each includes removable spool pieces 16 and 17. Spool piece 16 is connected at one end to the coolant pipe by pipe fitting 18 and at the other end to spool piece 17 by pipe fitting 19. Spool piece 17 extends through a shield sleeve 20 projected through the wall of the reactor chamber. To facilitate access into the reactor chamber for purposes of severing the connection between spool pieces 17 and nozzles 14 each shield sleeve is formed in split sections 15 as shown in the drawing.

In order to provide for downward movement of the pressure vessel into the burial chamber, an elevator drive for the detached platform 8 is located within the primary entombment area 5. In the construction shown in the drawings, the elevator drive includes a pair of spaced jack screws 21 and 22 disposed underneath the platform 8 alongside the rigid support columns 9. The upper end of each jack screw extends into suitable receiving holes 23 formed in the platform 8 for this purpose. As shown, each jack screw is provided with a threaded support nut 24 which may be moved longitudinally along its respective jack screw from an inoperative position as indicated by solid lines in the drawing where it is out of contact with the platform to an operative position, as indicated by dotted lines in the drawing, engaging the platform. A suitable jack drive motor, indicated diagrammatically by reference numeral 25, is provided for effecting longitudinal movement of the jack screws.

During the operational life of the vessel, the support nuts are normally disposed in their inoperative position; and during this period, the jack screws play no role in supporting the platform, this function being assumed entirely by the rigid support columns. When, however, the pressure vessel is ready for burial and the support nuts have been moved into their operative position, support for the platform is provided by the jack screws and support nuts all of which will become abundantly clear from the following portion of the specification describing the operation of the elevator drive employed by the nuclear reactor installation of this invention.

For the purpose of clear description let us assume that the time has come when the pressure vessel of the nuclear reactor can no longer operate properly. Preparing the pressure vessel for entombment is accomplished by first disconnecting the coolant pipes 13. This is accomplished simply by removing spool piece 16, then removing the split shield sleeve supported section-by-section, and finally inserting a remote cutting tool (not shown) into the reactor chamber 3 through the annular spaces surrounding spool pieces 17 to thereby sever the connection between the spool pieces 17 and the nozzles 14.

Next, in sequence, the support nuts are adjusted so that they tightly engage the platform 8 and the rigid support columns 9 are dismantled and removed from within the burial chamber. Lower access way 26 leading into the primary entombment area of the burial chamber is provided for this purpose. The platform and pressure vessel is now support entirely by the support nuts and jack screws so that when the jack drive motor 25 is activated to cause the nuts 24 to move longitudinally downward, the pressure vessel will be lowered into the primary entombment area of the burial chamber.

After placement of the pressure vessel in the burial chamber, one of two procedures may be followed. In the event it is desired to continue operation of the installation the exhausted pressure vessel may be moved laterally from its position within the primary entombment area into a position within the auxilliary entombment area where it is disposed out of the path of downward movement of platform 8 and vessel 1. The unloaded platform may then be raised into its initial position and the support columns reinstalled. A new pressure vessel is then installed through the opening in the top of the reactor chamber provided by removing cover 11 and the coolant lines attached to a new vessel by reversing the procedure outlined above for originally disconnecting the coolant lines. Depending on the size of the burial chamber this procedure may be repeated ad infinitum for any number pressure vessels.

If, on the other hand, the entire installation is to be decommissioned, the burial chamber may be permanently sealed by pouring concrete, lead, or other suitable material into the remaining volume. For this purpose, upper access way 27 leading into the burial chamber is provided.

As an alternative to the elevator drive, removal of the pressure vessel from the reactor chamber into the burial chamber for the purpose of decommissioning the reactor installation may be advantageously accomplished by the use of shaped explosive charges capable of channeling the explosive force in predetermined directions carefully controlled by the strategic placement of the charges in and about the burial chamber. For example, in the presently preferred embodiment of this invention these charges are deployed on the support columns 9 in the areas indicated by arrows 28. Lower access way 26 permits entrance into the burial chamber for the purpose of deploying the explosive charges.

With this arrangement, the support columns will, upon detonation, be destroyed to thereby permit the detached platform 8 and pressure vessel 1 to drop under gravitational influence into the burial chamber. Permanent sealing of the burial chamber may then be accomplished by filling up the remaining volume of the burial chamber by pouring concrete, lead, sand, or mixtures of these or like materials through the upper access way 27.

Permanent sealing of the burial chamber may also be accomplished by the strategic placement of secondary shaped explosive charges exteriorly of the burial chamber as indicated by arrows 29 in the drawing. Controlled sequential detonation of the secondary charges subsequent to detonation of the charges located within the burial chamber will cause the burial chamber and surrounding earth to cave in around the exhausted pressure vessel resulting in the automatic and virtually effortless permanent sealing of the burial chamber in a very short time. It will also be recognized that the burial chamber may be permanently sealed by combined utilization of the upper access way 27 and deployment of the secondary explosive charges.

With a nuclear reactor installation as described above, it will be recognized that the problems heretofore encountered in disposing of contaminated reactor vessels have been completely eliminated in a simple, safe, and relatively inexpensive manner. No expensive equipment or machinery is needed to transport the spent vessel to a remote burial site since, with the above described construction, the spent vessel is buried in an on-site tomb formed integral with the nuclear reactor installation itself. Furthermore, disposal of the spent vessel is accomplished quickly with little expenditure of time and effort.

While the above description of the present invention has been made with reference to the preferred embodiment, it is to be understood that various changes may be made thereto without departing from the scope of the invention as set forth in the following claims.

We claim:

1. A nuclear reactor installation comprising:
   a. a reactor vessel adapted to contain nuclear fuel therein, said vessel being adapted for operation with said installation whereby it will become radioactively contaminated in the course of its operative life;
   b. a shield structure including:
      1. a reactor chamber for housing the reactor vessel during its operative life; and
      2. a burial chamber beneath the reactor chamber in communicating relationship with the reactor chamber and capable of receiving the reactor vessel at the expiration of its operative life for at least a time sufficient to permit the radioactive contamination to decay to acceptable levels;
   c. a platform supporting the reactor vessel within the reactor chamber, said platform being capable of permitting downward movement of said reactor vessel into the burial chamber;
   d. means for supporting said platform;
   e. means for withdrawing support from said platform; and
   f. means for withdrawing the reactor vessel from the reactor chamber to the burial chamber at the expiration of said operative life.

2. A nuclear reactor installation according to claim 1 wherein:
   a. said platform supporting the reactor vessel within the reactor chamber is adapted for downward movement into the burial chamber at the expiration of said operative life; and
   b. said means for withdrawing the reactor vessel from the reactor chamber to the burial chamber includes an elevator drive operatively connected to said platform whereby at the expiration of the operative life of the reactor vessel the elevator drive may be activated to cause downward movement of said platform and said exhausted vessel into the burial chamber.

3. A nuclear reactor installation according to claim 2 wherein:
   a. said burial chamber includes:
      1. a primary entombment area located directly beneath the reactor chamber for initially receiving the exhausted reactor vessel, and
      2. an auxilliary entombment area adjoining the primary entombment area for subsequently receiving the exhausted reactor vessel.

4. A nuclear reactor installation according to claim 3 wherein:
   a. said elevator drive comprises:
      1. first and second spaced jack screws mounted vertically for longitudinal movement with said primary entombment area, the upper ends of said jack screws extending up to said platform;
   b. first and second support nuts threadedly engaging the first and second jack screws respectively, said support nuts being movable longitudinally along their respective jack screws between an inoperative position out of contact with said platform to an operative position engaging and supporting said platform; and
   c. a drive motor operatively connected to said jack screws for effecting longitudinal movement of said support nuts.

5. A nuclear reactor installation according to claim 4 including:
   a. removable support means positioned within the burial chamber for supporting the platform during the operative life of the reactor vessel in a position defining the floor of the reactor chamber; and
   b. an access way leading into the lower portion of the burial chamber to permit entrance into the burial chamber for the purpose of removing said support means in preparation for entombment of said exhausted reactor vessel.

6. A nuclear reactor installation according to claim 5 including:
   a. an access way leading into the upper portion of the burial chamber through which sealing material may be poured to permanently seal the burial chamber.

7. A nuclear reactor installation according to claim 6 wherein:
   a. said reactor chamber is located above ground level, and
   b. said burial chamber is located below ground level.

8. A nuclear reactor installation according to claim 1 wherein:
   a. said means for withdrawing the reactor vessel from the reactor chamber to the burial chamber includes:
      1. s support structure supporting the reactor vessel within the reactor chamber; and
      2. at least one explosive charge positioned such that upon detonation said support structure is destroyed thereby allowing the reactor vessel to drop under the influence of gravity into the burial chamber.

9. A nuclear reactor installation according to claim 8 wherein:

a. each explosive charge is a shaped explosive charge capable of channeling the explosive force in a predetermined direction.

10. A nuclear reactor installation according to claim 9 wherein:
   a. said support structure includes:
      1. a platform detached from the shield structure; and
      2. at least one removable support column positioned within the burial chamber for supporting the platform during the operative life of the reactor vessel in a position defining the floor of reactor chamber; and
   b. each shaped explosive charge is deployed on each support column.

11. A nuclear reactor installation according to claim 9 wherein:
   a. said reactor is located above ground level; and
   b. said burial chamber is located below ground level.

12. A nuclear reactor installation according to claim 11 including:
   a. secondary shaped explosive charges situated exteriorly of the burial chamber for the purpose of permanently sealing the burial chamber after removal of the reactor vessel into the burial chamber.

13. A nuclear reactor installation according to claim 12 including:
   an access way leading into the lower portion of the burial chamber to permit entrance into the burial chamber for purpose of deploying each explosive charge.

14. A nuclear reactor installation according to claim 12 including:
   a. an access way leading into the upper portion of the burial chamber through which sealing material may be poured to permanently seal the burial chamber.

15. A a for disposing of a nuclear reactor vessel supported in a reactor chamber at the expiration of its operative life comprising the steps of:
   a. withdrawing support from the reactor vessel; and
   b. withdrawing the reactor vessel downwardly from the reactor chamber housing the a vessel during its operative life into a burial chamber beneath the reactor chamber and communicating with the reactor chamber, utilizing at least one explosive charge positioned such that upon detonating said charge, the structure supporting the vessel in the reactor chamber is destroyed to thereby allow the vessel to drop under the influence of gravity into the burial chamber.

16. The method according to claim 15 wherein the explosive charges are shaped explosive charges capable of channeling the explosive forces in a predetermined direction.

17. The method according to claim 16 including the step of:
   a. permanently sealing the burial chamber.

18. The method to claim 17 wherein
   a. sealing of the burial chamber is effected by detonating shaped explosive charges deployed exteriorly of the burial chamber.

19. A method for disposing of a plurality of nuclear reactor vessels supported in a reactor chamber in succession at the expiration of the operative life of each vessel including the steps of:
   a. withdrawing support from each reactor vessel;
   b. withdrawing the reactor vessel downwardly from the reactor chamber housing the vessel during its operative life into a burial chamber beneath the reactor chamber;
   c. moving each exhausted reactor vessel subsequent to placement thereof into the burial chamber out of the path of downward movement of the reactor vessel into the burial chamber; and
   d. reloading the reactor chamber with a new reactor vessel.

20. The method according to claim 19 wherein:
   a. movement of each exhausted reactor vessel into the burial chamber is accomplished by lowering the platform supporting the vessel in the reactor chamber during its operative life into the burial chamber.

21. The method according to claim 20 including the step of:
   a. raising the platform into its initial position within the reactor chamber prior to reloading the reactor chamber with a new reactor vessel.

* * * * *